(12) United States Patent
Carter (10) Patent No.: US 11,325,207 B2
(45) Date of Patent: May 10, 2022

(54) SYSTEMS AND METHODS FOR ADDITIVE MANUFACTURING

(71) Applicant: General Electric Company, Schenectady, NY (US)

(72) Inventor: William Thomas Carter, Galway, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 510 days.

(21) Appl. No.: 15/411,718

(22) Filed: Jan. 20, 2017

(65) Prior Publication Data

US 2018/0207750 A1     Jul. 26, 2018

(51) Int. Cl.
*B23K 26/342* (2014.01)
*B33Y 30/00* (2015.01)
(Continued)

(52) U.S. Cl.
CPC ........... *B23K 26/342* (2015.10); *B22F 12/00* (2021.01); *B23K 26/032* (2013.01);
(Continued)

(58) Field of Classification Search
CPC .... B23K 26/04; B23K 26/042; B23K 26/043; B23K 26/342; B23K 26/082;
(Continued)

(56) References Cited

U.S. PATENT DOCUMENTS 5,002,371 A   3/1991 Wright
5,881,084 A   3/1999 Huang et al.
(Continued)

FOREIGN PATENT DOCUMENTS

DE    10 2015 007790 A1   12/2016
DE       102015007790 A1   12/2016
(Continued)

OTHER PUBLICATIONS

Extended European Search Report and Opinion issued in connection with corresponding EP Application No. 18151774.9 dated Jun. 27, 2018.
(Continued)

*Primary Examiner* — Tu B Hoang
*Assistant Examiner* — Bonita Khlok
(74) *Attorney, Agent, or Firm* — Dinsmore & Shohl LLP (57) ABSTRACT

An additive manufacturing system includes a plurality of laser devices, a plurality of first scanning devices, and an optical system. The optical system includes an optical detector and a second scanning device. The plurality of laser devices are each configured to generate a laser beam. The plurality of first scanning devices is each configured to selectively direct the laser beam from a laser device of the plurality of laser devices across a powder bed. The laser beam generates a melt pool in the powder bed. The optical detector is configured to detect electromagnetic radiation generated by the melt pool. The second scanning device is configured to direct electromagnetic radiation generated by the melt pool to the optical detector. The optical system is configured to detect a position of the laser beams in the melt pool.

18 Claims, 3 Drawing Sheets

(51) Int. Cl.
  *B29C 64/153* (2017.01)
  *B29C 64/386* (2017.01)
  *B29C 64/282* (2017.01)
  *B29C 64/268* (2017.01)
  *B29C 64/277* (2017.01)
  *B33Y 50/02* (2015.01)
  *B22F 12/00* (2021.01)
  *B33Y 10/00* (2015.01)
  *B23K 26/082* (2014.01)
  *B23K 26/03* (2006.01)
  *B23K 26/06* (2014.01)
  *B28B 1/00* (2006.01)
  *B22F 10/10* (2021.01)

(52) U.S. Cl.
  CPC ........ *B23K 26/0604* (2013.01); *B23K 26/082* (2015.10); *B29C 64/153* (2017.08); *B29C 64/268* (2017.08); *B29C 64/277* (2017.08); *B29C 64/282* (2017.08); *B29C 64/386* (2017.08); *B33Y 10/00* (2014.12); *B33Y 30/00* (2014.12); *B33Y 50/02* (2014.12); *B22F 10/10* (2021.01); *B22F 2202/11* (2013.01); *B22F 2203/03* (2013.01); *B22F 2999/00* (2013.01); *B28B 1/001* (2013.01); *Y02P 10/25* (2015.11)

(58) Field of Classification Search
  CPC .............. B23K 26/032; B23K 26/0604; B22F 2003/1056; B22F 2003/1057; B22F 3/1055; B22F 3/10; B22F 2202/11; B22F 2203/11; B22F 2203/03; B22F 2998/00; B22F 2998/10; B22F 2999/00; B29C 64/282; B29C 64/153; B29C 64/386; B29C 64/277; B29C 64/268; B33Y 10/00; B33Y 30/00; B33Y 50/02; B28B 1/001

USPC .................. 219/76.1, 121.6, 121.61, 121.76, 219/121.78–121.81
  See application file for complete search history.

(56) References Cited

U.S. PATENT DOCUMENTS

| | | | |
|---|---|---|---|
| 7,423,236 | B2 | 9/2008 | Suh |
| 7,697,580 | B2 | 4/2010 | Smith et al. |
| 8,570,534 | B1 | 10/2013 | Loewgren |
| 8,971,362 | B2 | 3/2015 | Smith et al. |
| 2015/0268099 | A1 | 9/2015 | Craig et al. |
| 2015/0375456 | A1 | 12/2015 | Cheverton et al. |
| 2016/0082668 | A1* | 3/2016 | Perret .................. B29C 64/277 264/406 |
| 2016/0303806 | A1 | 10/2016 | Mercelis |
| 2018/0093416 | A1* | 4/2018 | Prexler ................. B33Y 10/00 |

FOREIGN PATENT DOCUMENTS

| | | |
|---|---|---|
| EP | 3 300 885 A1 | 4/2018 |
| WO | 2017/085470 A1 | 5/2017 |

OTHER PUBLICATIONS

Purtonen et al., "Monitoring and adaptive control of laser processes", Physics Procedia, vol. 56, pp. 1218-1231, 2014.

Alberts et al. "High speed melt pool & laser power monitoring for selective laser melting (SLM)", 9th International Conference on Photonic Technologies LANE 2016, 2016.

National Intellectual Property Administration, P. R. China, Third Office Action for CN Patent Appl No. 201810053631.8, dated Jan. 28, 2021.

* cited by examiner

SYSTEMS AND METHODS FOR ADDITIVE MANUFACTURING

BACKGROUND

The field of the disclosure relates generally to additive manufacturing systems, and more particularly, to systems and methods for in-build assessment and correction of laser pointing accuracy for multi-laser systems in a Direct Metal Laser Melting (DMLM) system.

At least some additive manufacturing systems involve the buildup of a powdered material to make a component. This method can produce complex components from expensive materials at a reduced cost and with improved manufacturing efficiency. At least some known additive manufacturing systems, such as DMLM systems, fabricate components using a laser device, a build platform, and a powder material, such as, without limitation, a powdered metal with a fine array of carbides. The laser device generates a laser beam that melts the powder material on the build platform in and around the area where the laser beam is incident on the powder material, resulting in a melt pool. For the manufacture of large components, at least some DMLM systems include multiple laser devices to increase the speed and efficiency of the manufacturing process. However, the position of each laser device must be monitored and calibrated to a set location to accurately produce the component.

BRIEF DESCRIPTION

In one aspect, an additive manufacturing system is provided. The additive manufacturing system includes a plurality of laser devices, a plurality of first scanning devices, and an optical system. The optical system includes an optical detector and a second scanning device. The plurality of laser devices are each configured to generate a laser beam. The plurality of first scanning devices is each configured to selectively direct the laser beam from a laser device of the plurality of laser devices across a powder bed. The laser beam generates a melt pool in the powder bed. The optical detector is configured to detect electromagnetic radiation generated by the melt pool. The second scanning device is configured to direct electromagnetic radiation generated by the melt pool to the optical detector. The optical system is configured to detect a position of the laser beams in the melt pool.

In another aspect, an additive manufacturing system is provided. The additive manufacturing system includes a plurality of laser devices, a plurality of first scanning devices, and a plurality of optical systems. The plurality of optical systems includes an optical detector and a second scanning device. The plurality of laser devices are each configured to generate a laser beam. The plurality of first scanning devices is each configured to selectively direct the laser beam from a laser device of the plurality of laser devices across a powder bed. The laser beam generates a melt pool in the powder bed. The optical detector is configured to detect electromagnetic radiation generated by the melt pool. The second scanning device is configured to direct electromagnetic radiation generated by the melt pool to the optical detector. The optical system is configured to detect a position of the laser beams in the melt pool.

In yet another aspect, a method for monitoring an additive manufacturing process is provided. The method includes directing a plurality of laser beams across a powder bed using a plurality of first scanning devices to generate a melt pool in the powder bed. The method also includes directing electromagnetic radiation generated by the melt pool to an optical detector using a second scanning device. The method further includes detecting the position of the plurality of laser beams in the melt pool using the optical detector.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", and "controller" are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the additive manufacturing systems with an optical system described herein detect the position of a laser beam in a melt pool and calibrate the position to improve the accuracy of the laser beam. The additive manufacturing system includes an optical system, a build platform, and a plurality of laser devices. Each laser devices generate a laser beam directed to the powdered build material on the build platform. The laser beam melts the powder material on the build platform in and around the area where the laser beam is incident on the powder material, resulting in a melt pool. The melt pool cools forming a component. Each laser device includes a first scanner configure to independently direct each laser beam across the melt pool. If the position of each laser beam is not calibrated to a set position, the constructed component will be manufactured with defects. The optical system detects the position of each laser beam in the melt pool and calibrates the position of each laser beam. A controller controls the first scanners to direct the laser beams to the correct positions.

Figure 1:
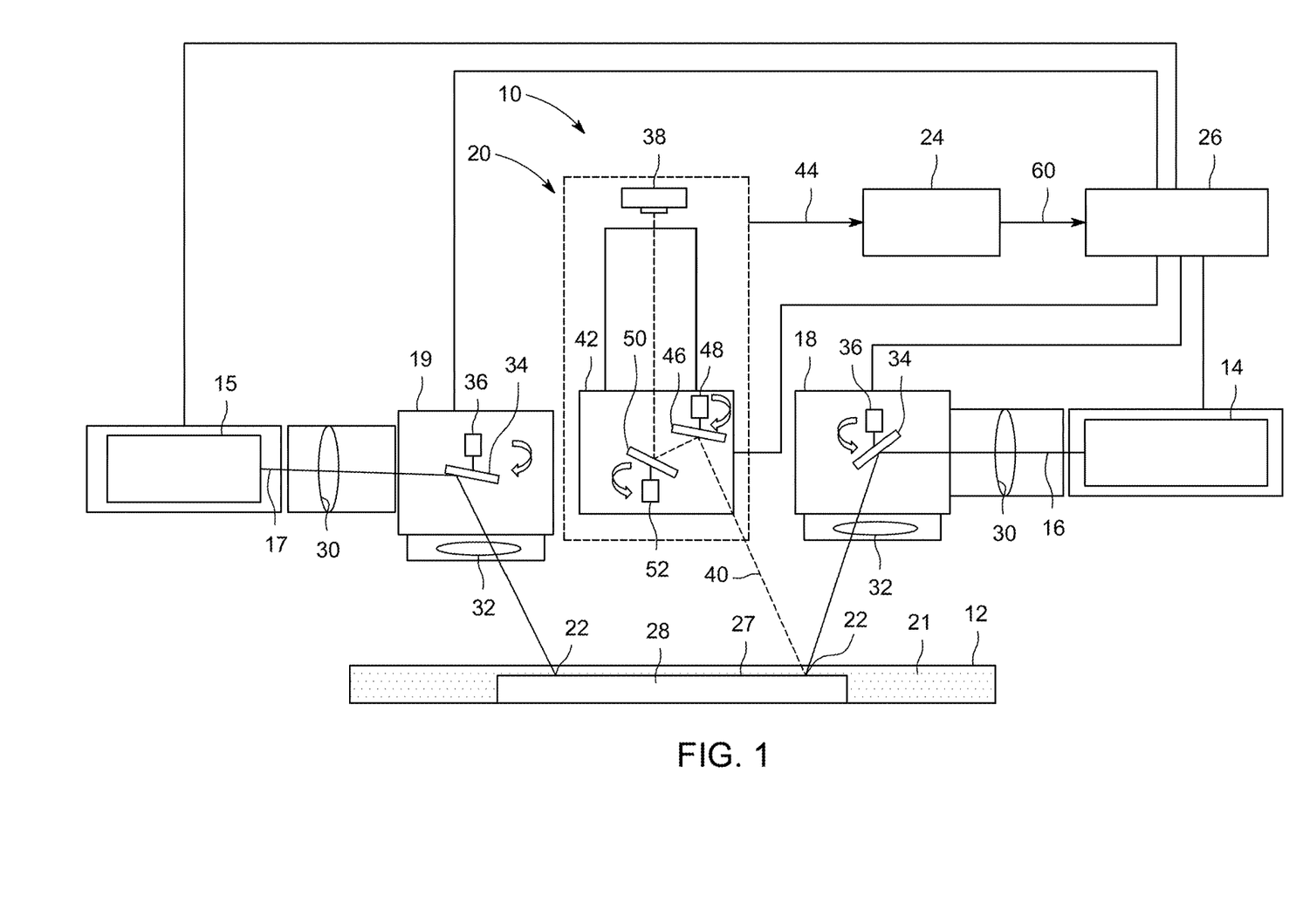
FIG. 1 is a schematic view of an exemplary additive manufacturing system shown in the form of a direct metal laser melting (DMLM) system including multiple lasers and a monitoring system.

FIG. 1 is a schematic view of an exemplary additive manufacturing system 10 illustrated in the form of a direct metal laser melting (DMLM) system. Although the embodiments herein are described with reference to a DMLM system, this disclosure also applies to other types of additive manufacturing systems, such as selective laser sintering systems.

In the exemplary embodiment, DMLM system 10 includes a build platform 12, a plurality of laser devices 14, 15 configured to generate a laser beam 16, 17, a plurality of first scanning devices 18, 19 configured to selectively direct laser beams 16, 17 across build platform 12, and an optical system 20 for monitoring a melt pool 22 created by laser beams 16, 17. The exemplary DMLM system 10 further includes a computing device 24 and a controller 26 configured to control one or more components of DMLM system 10, as described in more detail herein.

A powdered build material 21 includes materials suitable for forming a solid component 28, including, without limitation, gas atomized alloys of cobalt, iron, aluminum, titanium, nickel, and combinations thereof. In other embodiments, powdered build material 21 includes any suitable type of powdered build material. In yet other embodiments, powdered build material 21 includes any suitable build material that enables DMLM system 10 to function as described, including, for example and without limitation, ceramic powders, metal-coated ceramic powders, and thermoset or thermoplastic resins. Powdered build material 21 is spread across build platform 12 to form a powdered bed 27. Powdered build material 21 within powdered bed 27 is then melted and re-solidified during the additive manufacturing process to build a solid component 28 on build platform 12.

As shown in FIG. 1, each laser device 14, 15 is configured to generate a laser beam 16, 17 of sufficient energy to at least partially melt powdered build material 21 of build platform 12. In the exemplary embodiment, laser devices 14, 15 are a yttrium-based solid state laser configured to emit a laser beam having a wavelength of about 1070 nanometers (nm). In other embodiments, laser devices 14, 15 includes any suitable type of laser that enables DMLM system 10 to function as described herein, such as a carbon dioxide laser. Further, although DMLM system 10 is shown and described as including two laser devices 14, 15, DMLM system 10 includes any combination of laser devices that enable DMLM system 10 to function as described herein. In one embodiment, for example, DMLM system 10 includes a first laser 14 device having a first power and a second laser device 15 having a second power different from the first laser power, or at least two laser devices having substantially the same power output. In yet other embodiments, DMLM system 10 includes six laser devices. In yet other embodiments, DMLM system 10 includes sixteen laser devices.

Laser devices 14, 15 are optically coupled to optical elements 30 and 32 that facilitate focusing laser beams 16, 17 on build platform 12. In the exemplary embodiment, optical elements 30 and 32 include a beam collimator 30 disposed between laser devices 14, 15 and first scanning devices 18, 19, and an F-theta lens 32 disposed between the first scanning devices 18, 19 and build platform 12. In other embodiments, DMLM system 10 includes any suitable type and arrangement of optical elements that provide a collimated and/or focused laser beam on build platform 12.

First scanning devices 18, 19 are configured to direct laser beams 16, 17 across selective portions of build platform 12 to create solid component 28. In the exemplary embodiment, first scanning devices 18, 19 are a galvanometer scanning devices including a mirror 34 operatively coupled to a galvanometer-controlled motor 36 (broadly, an actuator). Motor 36 is configured to move (specifically, rotate) mirror 34 in response to signals received from controller 26, and thereby deflect laser beams 16, 17 across selective portions of build platform 12. Mirror 34 includes any suitable configuration that enables mirror 34 to deflect laser beams 16, 17 towards build platform 12. In some embodiments, mirror 34 includes a reflective coating that has a reflectance spectrum that corresponds to the wavelength of laser beams 16, 17.

Although first scanning devices 18, 19 are illustrated with a single mirror 34 and a single motor 36, first scanning devices 18, 19 include any suitable number of mirrors and motors that enable first scanning devices 18, 19 to function as described herein. In one embodiment, for example, first scanning devices 18, 19 include two mirrors and two galvanometer-controlled motors, each operatively coupled to one of the mirrors. In yet other embodiments, first scanning devices 18, 19 include any suitable scanning device that enables DMLM system 10 to function as described herein, such as, for example, two-dimension (2D) scan galvanometers, three-dimension (3D) scan galvanometers, and dynamic focusing galvanometers.

Optical system 20 is configured to detect electromagnetic radiation generated by melt pool 22 and transmit information about melt pool 22 to computing device 24. Specifically, optical system 20 detects the location of laser beams 16, 17 in melt pool 22. In the exemplary embodiment, optical system 20 includes an first optical detector 38 configured to detect electromagnetic radiation 40 (also referred to as "EM radiation") generated by melt pool 22, and a second scanning device 42 configured to direct EM radiation 40 to first optical detector 38. More specifically, first optical detector 38 is configured to receive EM radiation 40 generated by melt pool 22, and generate an electrical signal 44 in response thereto. First optical detector 38 is communicatively coupled to computing device 24, and is configured to transmit electrical signal 44 to computing device 24.

First optical detector 38 includes any suitable optical detector that enables optical system 20 to function as described herein, including, for example and without limitation, a photomultiplier tube, a photodiode, an infrared camera, a charged-couple device (CCD) camera, a CMOS camera, a pyrometer, or a high-speed visible-light camera. Although optical system 20 is shown and described as including a single first optical detector 38, optical system 20 includes any suitable number and type of optical detectors that enables DMLM system 10 to function as described herein. In one embodiment, for example, optical system 20 includes a first optical detector configured to detect EM radiation within an infrared spectrum, and a second optical detector configured to detect EM radiation within a visible-light spectrum. In embodiments including more than one optical detector, optical system 20 includes a beam splitter (not shown) configured to divide and deflect EM radiation 40 from melt pool 22 to a corresponding optical detector.

While optical system 20 is described as including "optical" detectors for EM radiation 40 generated by melt pool 22, it should be noted that use of the term "optical" is not to be equated with the term "visible." Rather, optical system 20 is configured to capture a wide spectral range of EM radiation. For example, first optical detector 38 is sensitive to light with wavelengths in the ultraviolet spectrum (about 200-400 nm), the visible spectrum (about 400-700 nm), the near-infrared spectrum (about 700-1,200 nm), and the infrared spectrum (about 1,200-10,000 nm). Further, because the type of EM radiation emitted by melt pool 22 depends on the temperature of melt pool 22, optical system 20 is capable of monitoring and measuring both a size and a temperature of melt pool 22.

Second scanning device 42 is configured to direct EM radiation 40 generated by melt pool 22 to first optical detector 38. In the exemplary embodiment, second scanning device 42 is a galvanometer scanning device including a first mirror 46 operatively coupled to a first galvanometer-controlled motor 48 (broadly, an actuator), and a second mirror 50 operatively coupled to a second galvanometer-controlled motor 52 (broadly, an actuator). First motor 48 and second motor 52 are configured to move (specifically, rotate) first mirror 46 and second mirror 50, respectively, in response to signals received from controller 26 to deflect EM radiation 40 from melt pool 22 to first optical detector 38. First mirror 46 and second mirror 50 has any suitable configuration that enables first mirror 46 and second mirror 50 to deflect EM radiation 40 generated by melt pool 22. In some embodiments, one or both of first mirror 46 and second mirror 50 includes a reflective coating that has a reflectance spectrum that corresponds to EM radiation that first optical detector 38 is configured to detect.

Although second scanning device 42 is illustrated and described as including two mirrors and two motors, second scanning device 42 includes any suitable number of mirrors and motors that enable optical system 20 to function as described herein. Further, second scanning device 42 includes any suitable scanning device that enables optical system 20 to function as described herein, such as, for example, two-dimension (2D) scan galvanometers, three-dimension (3D) scan galvanometers, and dynamic focusing galvanometers.

Figure 2:
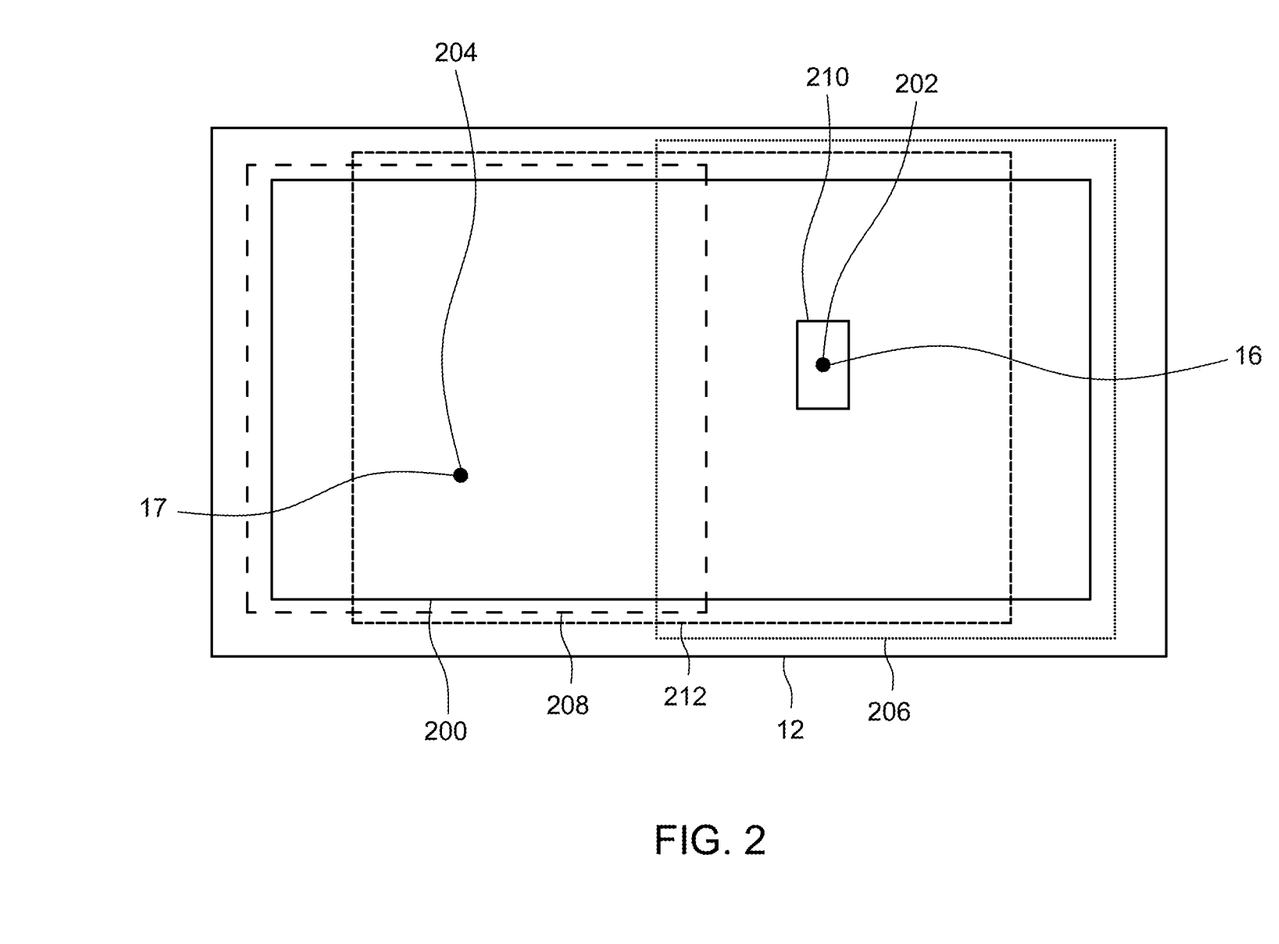
FIG. 2 is a schematic view of a powder bed of the optical system of FIG. 1.

FIG. 2 is a schematic view of a powdered bed 200 of optical system 20 (shown in FIG. 1) from which optical detector 38 receives EM radiation. Powdered bed 200 comprises an area of build platform 12, which, in the illustration shown in FIG. 2, includes a first melt pool 202, a second melt pool 204, a first laser device range 206, a second laser device range 208, an observation zone 210, and an observation zone range 212. In the exemplary embodiment, observation zone 210 has a rectangular shape. In other embodiments, observation zone 210 may have any suitable size and shape that enables DMLM system 10 to function as described herein.

Observation zone 210 is moveable along build platform 12 within observation zone range 212. More specifically, the position of observation zone 210 can be adjusted using second scanning device 42. As described in more detail herein, second scanning device 42 is operated independently of first scanning devices 18, 19 such that observation zone 210 is adjusted to track multiple melt pools 202, 204 as laser beams 16, 17 are scanned across build platform 12. Additionally, the size, shape, and focus of observation zone 210 may be adjusted using various optical elements.

In the exemplary embodiment, laser beam 16 generates first melt pool 202 and laser beam 17 generates second melt pool 204. In the exemplary embodiment, Laser beam 16 is moveable along build platform 12 within first laser device range 206 and laser beam 17 is moveable along build platform 12 within second laser device range 208. Thus, laser beam 16 generates first melt pool 202 within first laser device range 206 and laser beam 17 generates second melt pool 204 within second laser device range 208. Combined the sum of first laser device range 206 and second laser device range 208 encompasses powdered bed 200. First laser device range 206 and second laser device range 208 must overlap. In the exemplary embodiment, first laser device range 206 and second laser device range 208 overlap such that first laser device range 206 covers a portion of powdered bed 200 and second laser device range 208 covers a portion of powdered bed 200. In another embodiment, first laser device range 206 and second laser device range 208 both encompasses powdered bed 200. Observation zone 210 must encompass a portion of first laser device range 206 and second laser device range 208. In the exemplary embodiment, observation zone 210 encompasses a portion of first laser device range 206 and second laser device range 208. In another embodiment, observation zone 210 encompasses the sum of first laser device range 206 and second laser device range 208. In yet another embodiment, observation zone 210 encompasses powdered bed 200. Laser beams 16, 17 and observation zone 210 are each independently moved across powdered bed 200 using first scanning devices 18, 19 and second scanning device 42.

Optical detector 38 detects the position of melt pools 202, 204 and sends electrical signal 44 to computing device 24. Optical detector 38 is either detecting the position of melt pools 202, 204 or switching between melt pools 202, 204. When detecting the position of melt pools 202, 204, observation zone 210 moves with the same velocity as melt pools 202, 204 and the position of melt pools 202, 204 is in the center of observation zone 210. Computing device 24 processes the position of melt pools 202, 204 to determine if melt pools 202, 204 are in the correct location. Computing device 24 generates control signals 60 that are fed back to controller 26 and used to adjust first scanning devices 18, 19. First scanning devices 18, 19 adjust the position of melt pools 202, 204 based on feedback from controller 26. Thus, if melt pools 202, 204 are in the wrong location relative to each other or to solid component 28, optical system 20 provides feedback to adjust the position of melt pools 202, 204. Adjusting the position of melt pools 202, 204 reduces defects in solid component 28. Sequentially tracking laser beams 16, 17 and applying corrective action in the case that laser beams 16, 17 are not aimed properly, will ensure that each melt pool 202, 204 is positioned correctly relative to observation zone range 212.

Computing device 24 includes a computer system that includes at least one processor (not shown in FIG. 1) that executes executable instructions to operate DMLM system 10. Computing device 24 includes, for example, a calibration model of DMLM system 10 and an electronic computer build file associated with a component, such as component 28. The calibration model includes, without limitation, an expected or desired melt pool size and temperature under a given set of operating conditions (e.g., a power of laser device 14) of DMLM system 10. The build file includes build parameters that are used to control one or more components of DMLM system 10. Build parameters include, without limitation, a power of laser device 14, a scan speed of first scanning device 18, a position and orientation of first scanning device 18 (specifically, mirror 34), a scan speed of second scanning device 42, and a position and orientation of second scanning device 42 (specifically, first mirror 46 and second mirror 50). In the exemplary embodiment, computing device 24 and controller 26 are shown as separate devices. In other embodiments, computing device 24 and controller 26 are combined as a single device that operates as both computing device 24 and controller 26 as each are described herein.

In the exemplary embodiment, computing device 24 is also configured to operate at least partially as a data acquisition device and to monitor the operation of DMLM system 10 during fabrication of component 28. In one embodiment, for example, computing device 24 receives and processes electrical signals 44 from first optical detector 38. Computing device 24 stores information associated with melt pool 22 based on electrical signals 44, which is used to facilitate controlling and refining a build process for DMLM system 10 or for a specific component built by DMLM system 10.

Further, computing device 24 is configured to adjust one or more build parameters in real-time based on electrical signals 44 received from first optical detector 38. For example, as DMLM system 10 builds component 28, computing device 24 processes electrical signals 44 from first optical detector 38 using data processing algorithms to determine the size and temperature of melt pool 22. Computing device 24 compares the size and temperature of melt pool 22 to an expected or desired melt pool size and temperature based on a calibration model. Computing device 24 generates control signals 60 that are fed back to controller 26 and used to adjust one or more build parameters in real-time to correct discrepancies in melt pool 22. For example, where computing device 24 detects discrepancies in melt pool 22, computing device 24 and/or controller 26 adjusts the power of laser device 14 during the build process to correct such discrepancies.

Controller 26 includes any suitable type of controller that enables DMLM system 10 to function as described herein. In one embodiment, for example, controller 26 is a computer system that includes at least one processor and at least one memory device that executes executable instructions to control the operation of DMLM system 10 based at least partially on instructions from human operators. Controller 26 includes, for example, a 3D model of component 28 to be fabricated by DMLM system 10. Executable instructions executed by controller 26 includes controlling the power output of laser devices 14, 15, controlling a position and scan speed of first scanning devices 18, 19, and controlling a position and scan speed of second scanning device 42.

Controller 26 is configured to control one or more components of DMLM system 10 based on build parameters associated with a build file stored, for example, within computing device 24. In the exemplary embodiment, controller 26 is configured to control first scanning device 18, 19 based on a build file associated with a component to be fabricated with DMLM system 10. More specifically, controller 26 is configured to control the position, movement, and scan speed of mirror 34 using motor 36 based upon a predetermined path defined by a build file associated with component 28.

In the exemplary embodiment, controller 26 is also configured to control second scanning device 42 to direct EM radiation 40 from melt pool 22 to first optical detector 38. Controller 26 is configured to control the position, movement, and scan speed of first mirror 46 and second mirror 50 based on at least one of the position of mirror 34 of first scanning device 18 and the position of melt pool 22. In one embodiment, for example, the position of mirror 34 at a given time during the build process is determined, using computing device 24 and/or controller 26, based upon a predetermined path of a build file used to control the position of mirror 34. Controller 26 controls the position, movement, and scan speed of first mirror 46 and second mirror 50 based upon the determined position of mirror 34. In another embodiment, first scanning devices 18, 19 are configured to communicate the position of mirror 34 to controller 26 and/or computing device 24, for example, by outputting position signals to controller 26 and/or computing device 24 that correspond to the position of mirror 34. In yet another embodiment, controller 26 controls the position, movement, and scan speed of first mirror 46 and second mirror 50 based on the position of melt pool 22. The location of melt pool 22 at a given time during the build process is determined, for example, based upon the position of mirror 34.

Controller 26 is also configured to control other components of DMLM system 10, including, without limitation, laser devices 14, 15. In one embodiment, for example, controller 26 controls the power output of laser devices 14, 15 based on build parameters associated with a build file.

Figure 3:
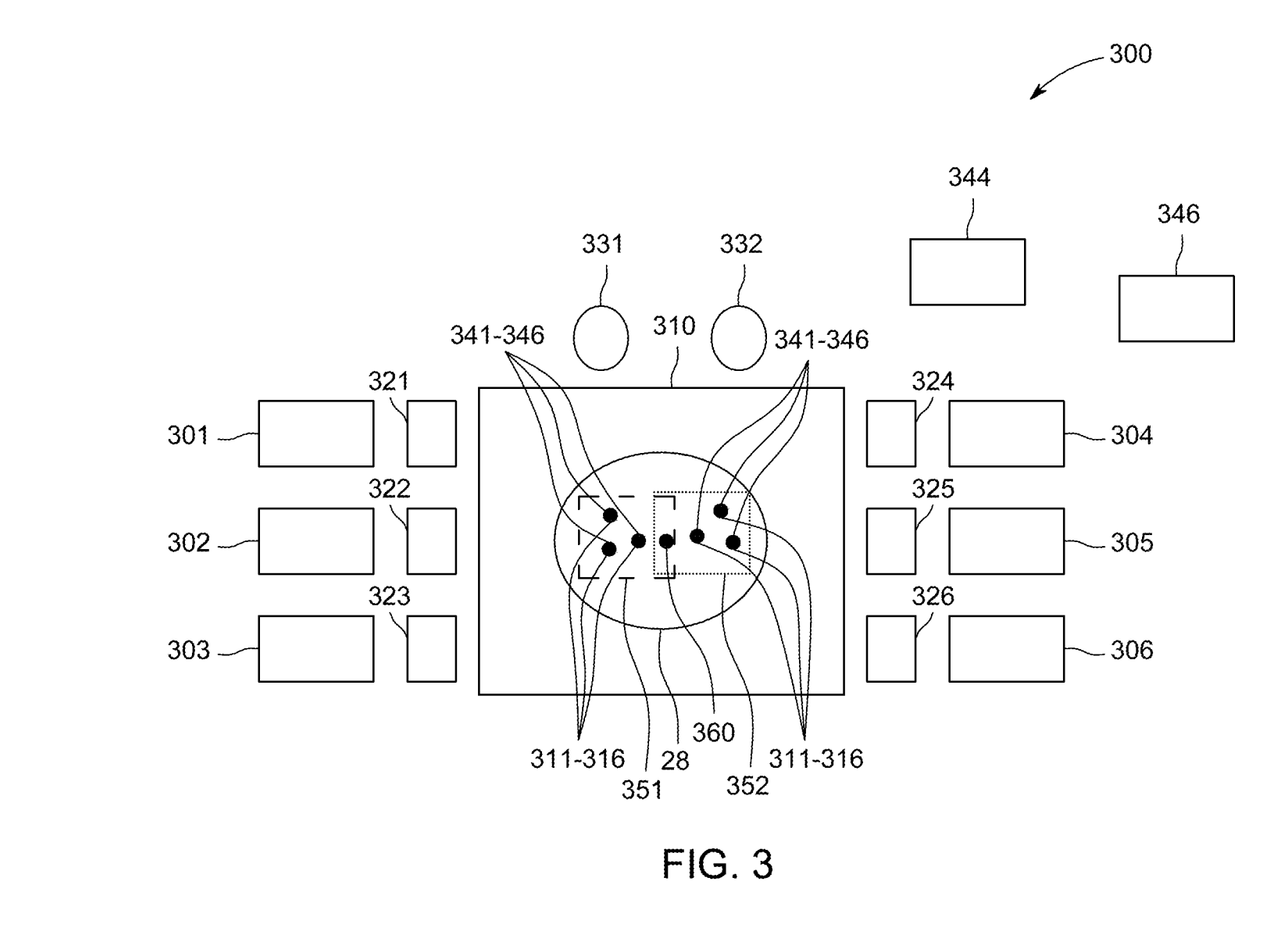
FIG. 3 is a schematic overhead view of an exemplary additive manufacturing system illustrated in the form of a direct metal laser melting (DMLM) system.

FIG. 3 is a schematic overhead view of an exemplary additive manufacturing system 300 illustrated in the form of a direct metal laser melting (DMLM) system. In the exemplary embodiment, DMLM system 300 includes a build platform 310, a plurality of laser devices 301-306 each configured to generate a laser beam 311-316, a plurality of first scanning devices 321-326 configured to selectively direct laser beams 311-316 across build platform 310, and a plurality of optical systems 331, 332 for monitoring a plurality of melt pools 341-346 created by laser beams 311-316. The exemplary DMLM system 300 further includes a computing device 344 and a controller 346 configured to control one or more components of DMLM system 300, as described in more detail herein.

In the exemplary embodiment, DMLM system includes six laser devices 301-306 configured to generate six laser beams 311-316. Each laser devices 301-306 has a laser device range (not shown). Each laser beam is movable across build platform 310 within the corresponding laser device range. Each laser beam 311-316 generates one of six melt pools 341-346. A first optical system 331 and a second optical system 332 each observe melt pools 341-346 through two observation zones (not shown). First optical system 331 observes melt pools 341-346 through a first observation zone (not shown) and second optical system 332 observes melt pools 341-346 through a second observation zone (not shown). First optical system 331 has a first observation zone range 351 and second optical system 332 has a second observation zone range 352. Each observation zone range 351, 352 comprise an area of build platform 310.

First and second observation zones are moveable along build platform 310 within observation zone range 351, 352. More specifically, the position of first and second observation zones is adjusted using a second scanning device (not shown in FIG. 3). Second scanning devices are operated independently of first scanning devices 321-326 such that first and second observation zones are adjusted to track multiple melt pools 341-346 as laser beams 311-316 are scanned across build platform 310.

In the exemplary embodiment, observation zone ranges 351, 352 overlap such that each optical system 331, 332 observes a calibration point 360. Optical systems 331, 332 detect the position of laser beams 311-316 and calibrates the position of laser beams 311-316 to calibration point 360. Calibrating the position of laser beams 311-316 to calibration point 360 improves the accuracy of laser beams 311-316 and reduces defects in component 28. Using multiple optical systems 331, 332 to observe and track laser beams 311-316 increases the speed of building component 28.

Embodiments of the additive manufacturing systems with an optical system described herein detect the position of a laser beam in a melt pool and calibrate the position to improve the accuracy of the laser beam. The additive manufacturing system includes an optical system, a build platform, and a plurality of laser devices. Each laser devices generate a laser beam directed to the powdered build material on the build platform. The laser beam melts the powder material on the build platform in and around the area where the laser beam is incident on the powder material, resulting in a melt pool. The melt pool cools forming a component. Each laser device includes a first scanner configure to independently direct each laser beam across the melt pool. If the position of each laser beam is not calibrated to a set position, the constructed component will be manufactured with defects. The optical system detects the position of each laser beam in the melt pool and calibrates the position of each laser beam. A controller controls the first scanners to direct the laser beams to the correct positions.

An exemplary technical effect of the methods and systems described herein includes: (a) monitoring the position of multiple laser beams in a melt pool; (b) controlling the position of multiple laser beams in a melt pool; (c) improving the precision of components fabricated using additive manufacturing processes; (d) improving the accuracy of melt pool monitoring during additive manufacturing processes; and (e) reducing defects in a solid component.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of additive manufacturing systems having a monitoring system are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with additive manufacturing systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. An additive manufacturing system comprising:
   a plurality of laser devices, each laser device of the plurality of laser devices configured to generate a laser beam;

a plurality of first scanning devices, each scanning device of the plurality of first scanning devices configured to selectively direct the laser beam from a laser device of said plurality of laser devices across a powder bed, wherein each laser beam generates a melt pool in the powder bed forming a plurality of melt pools in the powder bed;

an optical system comprising:
an optical detector configured to detect electromagnetic radiation generated by the plurality of melt pools; and
a second scanning device configured to direct electromagnetic radiation generated by the plurality of melt pools to said optical detector, wherein said optical system is configured to detect a position of each laser beam directed by each scanning device of said plurality of first scanning devices in the plurality of melt pools, wherein said optical system is configured to receive electromagnetic radiation from at least one observation zone, and wherein said second scanning device is configured to scan the at least one observation zone across the powder bed to sequentially track the plurality of melt pools generated by each laser beam directed by each scanning device of said plurality of first scanning devices independent of other scanning devices of said plurality of first scanning devices;

a computing device configured to:
receive a signal based on the electromagnetic radiation generated by the plurality of melt pools from said optical detector; and
analyze the received signal to determine whether the plurality of melt pools are in a correct location relative to each other; and a controller configured to:
receive a signal based on the analysis from the computing device; and
adjust the position of the plurality of melt pools relative to each other by controlling said plurality of first scanning devices when the plurality of melt pools are not in the correct location relative to each other.

2. The additive manufacturing system in accordance with claim 1, wherein each first scanning device of said plurality of first scanning devices is configured to direct the laser beam from said laser device of said plurality of laser devices into the observation zone.

3. The additive manufacturing system in accordance with claim 1, wherein said optical system is further configured to receive electromagnetic radiation from a plurality of observation zones, said second scanning device configured to scan the plurality of observation zones across the powder bed to track the plurality of melt pools independent of said plurality of first scanning devices.

4. The additive manufacturing system in accordance with claim 3, wherein each first scanning device of said plurality of first scanning devices is configured to direct the laser beam from said laser device of said plurality of laser devices into an observation zone of the plurality of observation zones.

5. The additive manufacturing system in accordance with claim 4, wherein each observation zone of the plurality of observation zones overlap at least a portion of another observation zone of the plurality of observation zones.

6. The additive manufacturing system in accordance with claim 4, wherein each observation zone of the plurality of observation zones does not overlap any other observation zone of the plurality of observation zones.

7. The additive manufacturing system in accordance with claim 1, wherein said second scanning device comprises at least one mirror and at least one actuator operatively coupled to said at least one mirror.

8. The additive manufacturing system in accordance with claim 1 further comprising controlling the plurality of first scanning devices based on the position of the plurality of melt pools.

9. An additive manufacturing system comprising:
a plurality of laser devices, each laser device of the plurality of laser devices configured to generate a laser beam;
a plurality of first scanning devices, each scanning device of the plurality of scanning devices configured to selectively direct the laser beam from a laser device of said plurality of laser devices across a powder bed, wherein each laser beam generates a melt pool in the powder bed forming a plurality of melt pools in the powder bed;
a plurality of optical systems, each optical system of the plurality of optical systems comprising:
an optical detector configured to detect electromagnetic radiation generated by the plurality of melt pools; and
a second scanning device configured to direct electromagnetic radiation generated by the plurality of melt pools to said optical detector, wherein said plurality of optical systems are configured to detect a position of each laser beam directed by each scanning device of said plurality of first scanning devices in the plurality of melt pools, wherein said plurality of optical systems are configured to receive electromagnetic radiation from at least one observation zone, and wherein said second scanning device is configured to scan the at least one observation zone across the powder bed to sequentially track the plurality of melt pools generated by each laser beam directed by each scanning device of said plurality of first scanning devices independent of other scanning devices of said plurality of first scanning devices;
a computing device configured to:
receive a signal based on the electromagnetic radiation generated by the plurality of melt pools from said optical detector; and
analyze the received signal to determine whether the plurality of melt pools are in a correct location relative to each other; and
a controller configured to:
receive a signal based on the analysis from the computing device; and
adjust the positions of the plurality of melt pools relative to each other by controlling said plurality of first scanning devices when the plurality of melt pools are not in the correct location relative to each other.

10. The additive manufacturing system in accordance with claim 9, wherein each first scanning device of said plurality of first scanning devices is configured to direct the laser beam from said laser device of said plurality of laser devices into the observation zone.

11. The additive manufacturing system in accordance with claim 9, wherein said plurality of optical systems are further configured to receive electromagnetic radiation from a plurality of observation zones, said second scanning device configured to scan the plurality of observation zones across the powder bed to track the plurality of melt pools independent of said plurality of first scanning devices.

12. The additive manufacturing system in accordance with claim 11, wherein each first scanning device of said plurality of first scanning devices is configured to direct the laser beam from said laser device of said plurality of laser devices into an observation zone of the plurality of observation zones.

13. The additive manufacturing system in accordance with claim 12, wherein each observation zone of the plurality of observation zones overlap at least a portion of another observation zone of the plurality of observation zones.

14. The additive manufacturing system in accordance with claim 12, wherein each observation zone of the plurality of observation zones does not overlap any other observation zone of the plurality of observation zones.

15. The additive manufacturing system in accordance with claim 9 further comprising controlling said plurality of first scanning devices based on the position of the plurality of melt pools.

16. A method for monitoring an additive manufacturing process, said method comprising:
   directing a plurality of laser beams across a powder bed using a plurality of first scanning devices to generate a plurality of melt pools in the powder bed;
   directing electromagnetic radiation generated by the plurality of melt pools from at least one observation zone to an optical detector using a second scanning device;
   scanning the at least one observation zone of the optical detector across the powder bed to sequentially track the plurality of melt pools generated by each laser beam directed by each scanning device of said plurality of first scanning devices using the second scanning device independent of other scanning devices of said plurality of first scanning devices;
   detecting the position of each laser beam directed by each scanning device of said plurality of first scanning devices in the plurality of melt pools using the optical detector;
   analyzing a signal received based on the electromagnetic radiation generated by the plurality of melt pools from said optical detector to determine whether the plurality of melt pools are in a correct location relative to each other; and
   adjusting the positions of the plurality of melt pools relative to each other using a computing device to control the plurality of first scanning devices when the plurality of melt pools are not in the correct location relative to each other.

17. The method in accordance with claim 16 further comprising controlling the plurality of first scanning devices based on the position of the plurality of melt pools.

18. The method in accordance with claim 16, wherein the second scanning device includes a mirror and an actuator operatively coupled to the mirror, wherein directing electromagnetic radiation generated by the plurality of melt pools comprises rotating the mirror using the actuator such that electromagnetic radiation generated by the plurality of melt pools is deflected by the mirror to the optical detector.

* * * * *